United States Patent [19]

Morrison

[11] Patent Number: 4,492,583
[45] Date of Patent: Jan. 8, 1985

[54] MEMBRANE TYPE COUPLINGS

[75] Inventor: Norman J. Morrison, Bramhall, England

[73] Assignee: Flexibox Limited, Manchester, England

[21] Appl. No.: 480,371

[22] Filed: Mar. 29, 1983

[30] Foreign Application Priority Data

Apr. 2, 1982 [GB] United Kingdom ................. 8209933

[51] Int. Cl.³ .......................... F16D 3/76; F16D 3/78
[52] U.S. Cl. ....................................... 464/99; 464/147
[58] Field of Search ...................... 464/51, 98, 99, 92, 464/94, 96, 147

[56] References Cited

U.S. PATENT DOCUMENTS

| 1,389,915 | 9/1921 | Thomas | 464/99 |
| 1,454,087 | 5/1923 | Thomas | 464/99 |
| 3,500,660 | 3/1970 | Anderson | 464/99 |
| 3,759,063 | 9/1973 | Bendall | 464/99 |
| 4,096,711 | 6/1978 | Carlson et al. | 464/99 |
| 4,196,597 | 4/1980 | Robinson | 464/99 |
| 4,416,645 | 11/1983 | Fredericks | 464/147 X |

FOREIGN PATENT DOCUMENTS 924796  5/1963  United Kingdom ................. 464/99

Primary Examiner—Stuart S. Levy
Assistant Examiner—Thomas R. Hannon
Attorney, Agent, or Firm—Bacon & Thomas

[57] ABSTRACT

A membrane type coupling has concentric input and output members, intermediate member and pair of spacers, the input and output members being connected to one each of the spacers, and the intermediate member being connected at either end to both spacers, by membrane packs. The connection between each spacer and at least one member comprising a pair of axially spaced packs. The coupling thus has lateral rigidity but angular and substantial axial flexibility.

6 Claims, 1 Drawing Figure

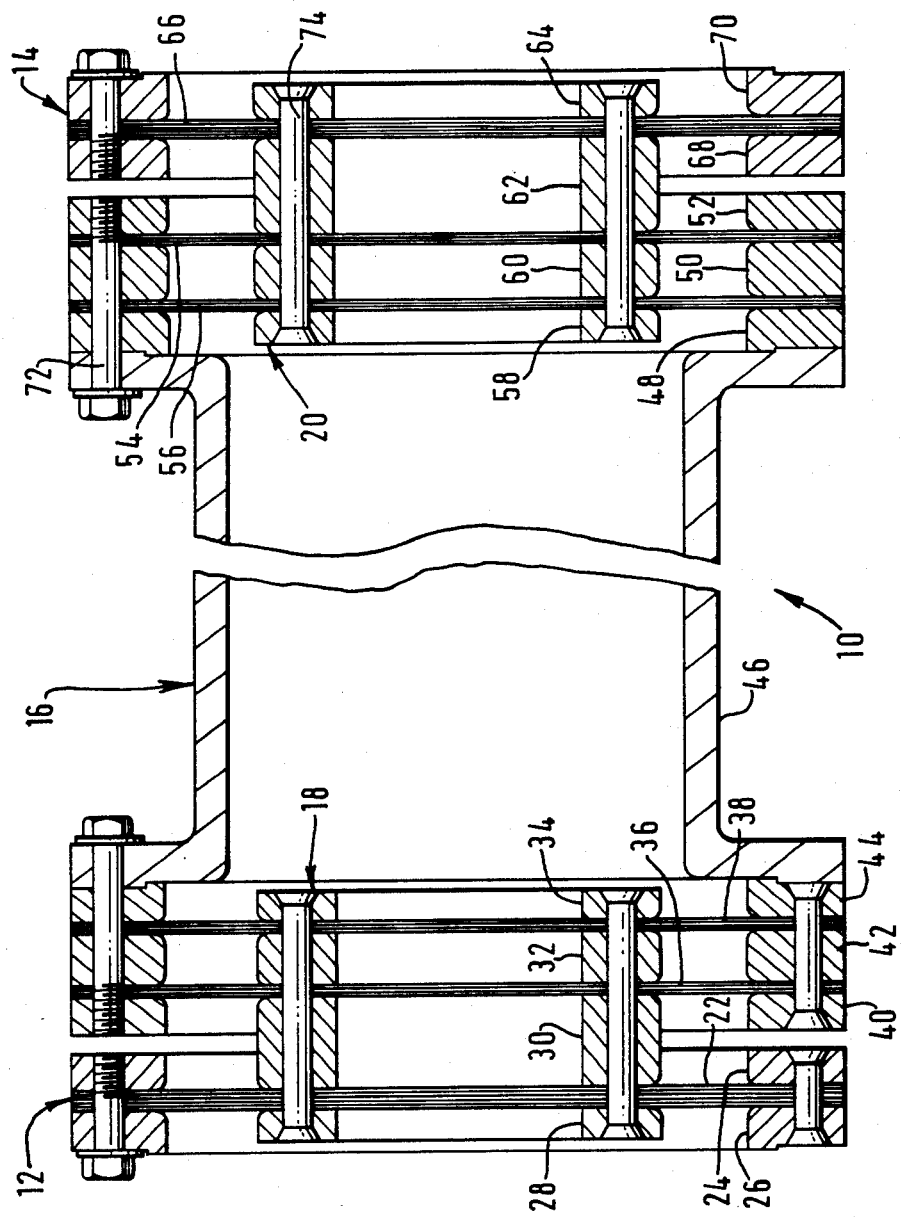

MEMBRANE TYPE COUPLINGS

TECHNICAL FIELD

This invention relates to couplings between rotating shafts and particularly to those which allow a certain degree of axial misalignment and/or movement between the two shafts.

BACKGROUND ART

Interengaging splined shafts fulfil this function but they require lubrication if there is much movement between the two shafts and indeed even if there is only a little. If there is normally only a little movement a step can form on the splines preventing or at least hindering further axial movement on the few occasions this may occur. Also, within normal manufacturing tolerances there is inevitably a certain degree of lost motion between the two shafts which thus allows a backlash to develop between them. A presently available coupling comprising membranes disposed radially between interjacent flanges on the two shafts solves many of these drawbacks. It can be built torsionally rigid within wide tolerances; it requires no lubrication and it does not wear. Furthermore it can accept angular misalignment between the shafts. Such a coupling is disclosed in U.S. Pat. No. 4,196,597.

However beyond fairly small limits of axial movement the axial loads on the shafts increase considerably. In other words these membranes do not allow adequate axial movement for some applications.

Joining couplings together does not help if the coupling is rendered laterally unstable.

It is an object of this invention therefore to provide a membrane-type coupling having both lateral stability and increased axial movement capability.

SUMMARY OF THE INVENTION

In accordance with this invention there is provided a coupling for rotating shafts comprising concentric input and output members for connection with respective driving and driven rotary shafts, a concentric intermediate member and, joining the intermediate member to each of the other members, a pair of concentric floating spacers, each floating spacer being connected to one member by a pair of spaced substantially radial membranes and to the other member by at least one substantially radial membrane.

BRIEF DESCRIPTION OF THE DRAWING

The invention is further described hereinafter with reference to the accompanying drawing in which a coupling according to the invention is shown in section.

DETAILED DESCRIPTION OF THE INVENTION

The coupling 10 comprises an input member 12 and an output member 14, the input member being adapted for connection with a driving shaft and the output member for connection with a driven shaft, neither of which is shown in the drawing. The coupling transmits torque from the driven to the driving shaft and is torsionally rigid. The coupling 10 further comprises an intermediate member 16 and two floating spacers 18 and 20 which are each concentric with the input and output members 12,14.

The input member 12 is connected to the floating spacer 18 by an annular membrane pack 22 which comprises a laminate of sheet steel lamellae. The membrane pack 22 is clamped between two rings 24,26 which constitute the input member 12. Similarly the floating spacer 18 comprises a number of rings 28,30,32,34 which are clamped together and between rings 28 and 30 of which the membrane pack 22 is held. The rings 30,32 and 34 clamp between themselves a pair of spaced membrane packs 36,38 which are also clamped between rings 40,42 and 44 forming part of the intermediate member 16. The membrane packs 36,38 each comprise a laminate as the pack 22 but in this instance each contains fewer lamellae and so offers less resistance to axial thrust. Indeed if each comprises half the number of lamellae as the pack 22 then the combined membranes 36,38 would have the same axial deflection characteristics as the single pack 22. The purpose of essentially splitting a single pack to form a pair 36,38 of spaced membranes is to provide a laterally and angularly rigid connection between the spacer 18 and the intermediate member 16. Nevertheless the pair 36,38 and the membrane 22 allow axial movement between the intermediate member 16 and input member 12.

The intermediate member 16 further comprises a torque tube 46 which could however be omitted to shorten the coupling 10. The torque tube 46 is connected to the ring 44 and to a further set of rings 48,50,52 which together clamp a further pair of spaced membranes 54,56. These are clamped to the floating spacer 20 around its periphery by rings 58,60,62 which together with a further ring 64 form the floating spacer 20. Between rings 62,64 a membrane pack 66 is clamped and the outer periphery of this membrane is clamped between two rings 68,70 forming the output member 14.

It will be appreciated from the drawing that the arrangement of the output member 14, the floating spacer 20, the intermediate member 16 and their interconnections is essentially the same as that for the input member 12, floating spacer 18, intermediate member 16 and their interconnections as described in detail above. Thus the connection between the spacer 20 and intermediate member 16 is both laterally and angularly rigid and this, together with the connection between the spacer 18 and intermediate member 16, renders the coupling 10 as a whole, although not laterally rigid, at least laterally stable. This means that while the input and output members may be supported on their respective shafts the rest of the coupling does not require any further external support in the lateral direction. The coupling is however angularly flexible at both ends and consequently, not only can it accept angular misalignment between the shafts attached to the input and output members but also it can accept lateral misalignment between those shafts.

It should be appreciated however that the provision of the spaced membranes 36,38 or 54,56 need not necessarily be between the intermediate member 16 and the spacers 18 and 20 respectively. They could instead and without altering the overall characteristics of the coupling 10 be disposed between the input and output members 12 and 14 and the spacers 18 and 20 respectively with single membranes connecting the intermediate member 16 to the floating spacers 18,20. Indeed their disposition may be mixed such that, referring to the drawing, the left hand side of the coupling 10 could be as illustrated while the right hand side, for instance, could have the double membrane pack 54,56 disposed between the spacer 20 and output member 14.

The rings comprising the various members and spacers may be clamped together by any convenient means. For instance a number of peripheral bolts 72 may be used or the rings may be riveted together as at 74.

What I claim is:

1. A rotary coupling comprising:
   (a) an input and output member connectable to a driving and a driven shaft respectively;
   (b) an intermediate member disposed concentrically with respect to the input and output members;
   (c) a pair of spacers disposed concentrically with respect to the intermediate member;
   (d) a pair of axially spaced membrane packs connecting one spacer to one of the intermediate member and the input member;
   (e) a membrane pack connecting said one spacer to the other of said intermediate member and input member;
   (f) a second pair of axially spaced membrane packs connecting the other spacer to one of the intermediate member and the output member; and
   (g) a second membrane pack connecting said other spacer to the other of said intermediate and output member, wherein said pairs of axially spaced membrane packs provide lateral stability to the coupling.

2. A coupling as claimed in claim 1 wherein the connection between each spacer and one member comprises said pair of axially spaced membrane packs and the connection between each spacer and the other member comprises a single membrane pack.

3. A coupling as claimed in claim 1 wherein the axial thickness of each single membrane pack is substantially the same as the combined axial thickness of each pair of membrane packs.

4. A coupling as claimed in claim 1 or 3 in which said pair of membrane packs connects the intermediate member to each spacer and the single membrane pack connects each spacer to respective input and output members.

5. A coupling as claimed in claim 1 or 3 wherein the input, output and intermediate members have substantially the same radial dimensions and wherein the spacers have smaller radial dimensions.

6. A coupling as claimed in claim 1 or 3 wherein the input, output and intermediate members and the spacers each comprise a plurality of rings and means securing said rings together and clamping therebetween said membrane packs.

* * * * *